United States Patent
Strathmeyer et al.

(10) Patent No.: US 6,901,068 B1
(45) Date of Patent: May 31, 2005

(54) APPARATUS AND METHOD FOR COMPUTER CONTROLLED CALL PROCESSING APPLICATIONS IN PACKET SWITCHED TELEPHONE NETWORKS

(75) Inventors: Carl R Strathmeyer, Reading, MA (US); Donald Finnie, Reading, MA (US)

(73) Assignee: Intel Corporation, Santa Clara, CA (US)

(*) Notice: Subject to any disclaimer, the term of this patent is extended or adjusted under 35 U.S.C. 154(b) by 714 days.

(21) Appl. No.: 09/723,747

(22) Filed: Nov. 28, 2000

Related U.S. Application Data

(63) Continuation-in-part of application No. 08/955,834, filed on Oct. 21, 1997, now Pat. No. 6,201,805.

(51) Int. Cl.⁷ .......................... H04L 12/56; H04L 12/28
(52) U.S. Cl. ..................... 370/356; 370/259; 370/401
(58) Field of Search ................... 370/252, 356, 370/256, 401, 458, 260, 352, 389, 390, 392, 400; 709/229, 245

(56) References Cited

U.S. PATENT DOCUMENTS

| | | | |
|---|---|---|---|
| 5,724,412 A | | 3/1998 | Srinivasan |
| 5,867,494 A | | 2/1999 | Krishnaswamy et al. |
| 5,905,872 A | * | 5/1999 | DeSimone et al. .......... 709/245 |
| 6,026,087 A | | 2/2000 | Mirashrafi et al. |
| 6,061,365 A | | 5/2000 | Yeung et al. |
| 6,094,479 A | | 7/2000 | Lindeberg et al. |
| 6,185,288 B1 | | 2/2001 | Wong |
| 6,199,096 B1 | | 3/2001 | Mirashrafi et al. |
| 6,201,805 B1 | | 3/2001 | Strathmeyer |
| 6,212,192 B1 | | 4/2001 | Mirashrafi et al. |
| 6,229,883 B1 | | 5/2001 | Kakizaki et al. |
| 6,407,996 B1 | | 6/2002 | Witchalls |
| 6,490,275 B1 | | 12/2002 | Sengodan |
| 6,614,781 B1 | | 9/2003 | Elliott et al. |
| 2001/0026548 A1 | | 10/2001 | Strathmeyer et al. |
| 2001/0028711 A1 | | 10/2001 | Antonucci et al. |
| 2001/0036176 A1 | | 11/2001 | Girard |
| 2002/0067816 A1 | | 6/2002 | Bushnell |
| 2002/0159574 A1 | | 10/2002 | Stogel |
| 2003/0142807 A1 | | 7/2003 | Dolan et al. |
| 2003/0147518 A1 | | 8/2003 | Albal et al. |

FOREIGN PATENT DOCUMENTS

| | | |
|---|---|---|
| EP | 0 843 454 A2 | 5/1998 |
| EP | 1 113 656 A2 | 7/2001 |
| EP | 1 211 875 A2 | 6/2002 |
| WO | WO 00/76158 A1 | 12/2000 |
| WO | WO 00/79756 A2 | 12/2000 |

(Continued)

OTHER PUBLICATIONS

J. Rosenberg et al., "Programming Internet Telephony Services," IEEE, IEEE Network, May/Jun. 1999, pp. 42–49, XP–000870630, USA.

H. Schulzrinne & J. Rosenberg, "Signaling for Internet Telephony," IEEE, 1998, pp. 298–307, USA.

H. Schulzrinne & J. Rosenberg, "The Session Initiation Protocol: Internet–Centric Signaling," IEEE, Oct. 2000, pp. 134–141, USA.

*Primary Examiner*—Afsar Qureshi
(74) *Attorney, Agent, or Firm*—Kacvinsky LLC

(57) ABSTRACT

A method is presented comprising transmitting, from an application computer communicably connected to a gatekeeper which is connected to a data network, packetized messages indicative of telephone calls in progress at an endpoint of the data network, or indicative of such endpoint, and transmitting, from the gatekeeper to the application computer, packetized messages indicative of a variety of information contained in the telephone calls so as to process such information for a variety of applications. Apparatus to implement the method is also presented.

9 Claims, 5 Drawing Sheets

FOREIGN PATENT DOCUMENTS

| | | |
|---|---|---|
| WO | WO 01/22720 A2 | 3/2001 |
| WO | WO 01/43379 A1 | 6/2001 |
| WO | WO 01/59987 A2 | 8/2001 |
| WO | WO 01/69899 A2 | 9/2001 |
| WO | WO 01/78358 A2 | 10/2001 |

* cited by examiner

APPARATUS AND METHOD FOR COMPUTER CONTROLLED CALL PROCESSING APPLICATIONS IN PACKET SWITCHED TELEPHONE NETWORKS

CROSS-REFERENCE TO RELATED APPLICATIONS

This application is a continuation-in-part application of U.S. patent application Ser. No. 08/955,834, filed on Oct. 21, 1997 now U.S. Pat. No. 6,201,805.

TECHNICAL FIELD

This invention relates to computer telephone integration (CTI) and, more specifically, to an improved method and apparatus for utilizing CTI techniques to process telephone calls using various applications in a packet switched telephone network.

BACKGROUND OF THE INVENTION

Telephony over packet networks, particularly over wide area networks such as the Internet, has received considerable attention in recent months. Specifically, scientists have begun exploring the possibility of sending voice and video information streams over packet switched data networks. The transmission of such information streams over packet switched networks can be more cost efficient than traditional telephony, which requires a dedicated circuit between the calling and called party.

Computer telephone integration has been widely applied to traditional telephony methods and apparatus, but has not as yet been successfully applied to the methods and apparatus used for packet network telephony. This invention specifies novel apparatus and methods, supplementary to known packet network telephony apparatus and methods, which enable CTI capabilities in such an environment, and use them to process telephone calls.

One possible set of methods and apparatus for completing calls over a packet switched network, which calls can handle voice and other information streams, is defined by ITU recommendation H.323. The H.323 standard is available from the International Telecommunication Union, of Geneva, Switzerland, and is hereby incorporated herein by this reference. The H.323 standard defines various protocols dealing with call control, call setup, call termination, and other similar techniques known to those in the packet network telephony art.

The H.323 standard defines a functional entity called a gatekeeper. The gatekeeper handles network functions such as bandwidth control, zone management, address translation, and admissions control for a designated set of network terminals. While all these functions are further defined in the previously incorporated standard, we set forth two examples below.

Bandwidth control provides a protocol by which the gatekeeper allocates a particular amount of network bandwidth to a particular connection. The gatekeeper can be contacted by either the calling or called party in order to change the amount of bandwidth allocated to a particular call.

As another example, the gatekeeper performs zone management. This function, as further defined in the H.323 standard, provides a mechanism for allocating sets of different terminals and other nodes in the network to a particular gateway. The H.323 standard provides a mechanism for dynamically altering the allocation of different network nodes to different gatekeepers.

The gatekeeper function provides services analogous to the call processing function within a private branch exchange (PBX) in conventional telephony. In traditional telephony, CTI features are provided by creating an interface between external application software and the call processing function within the PBX. By contrast, in the known packet network telephony art, interfaces to the gatekeeper are only defined from other gatekeepers, end points, and other network entities.

SUMMARY OF THE INVENTION

The above and other problems of the prior art are overcome and a technical advance is achieved in accordance with the present invention which relates to a packet network telephony call processing device (e.g.; an H.323 gatekeeper) which is arranged to interface with a plurality of external call processing applications programs which may be located on one or more remote computers. In accordance with the teachings of the present invention, a call processing application computer is connected to a gatekeeper computer, via a data network or otherwise, and these two entities exchange messages in the manner specified by the invention. The gatekeeper computer may be located with one of the terminals or may be located on a separate computer.

As well, the processing application computer may be located with the gatekeeper computer, or remote from it.

The call controller computer and applications computer(s) communicate with one another in order to perform various call control and other call processing application functions over the data network and to provide call information and control to a user of the applications computer. As packet switched telephone connections are set up between various terminals or other nodes, the call controller communicates with one or more application computers in order to provide the call information and call control functions required by the computer telephony applications residing on the application computers. Examples of these functions include establishing and tearing down calls, transferring calls, call conferencing, associating the applications computer with one or more specific end points in the call controller zone for monitoring and control, determining the state of calls at a given endpoint, determining the length of calls in progress at a given endpoint, determining the words exchanged in calls in progress at a given endpoint, determining the originating IP address of calls in progress at a given endpoint, routing unanswered new calls terminating at a given endpoint to another endpoint, and various other functions.

DETAIL DESCRIPTION OF THE PREFERRED EMBODIMENT

Figure 1:
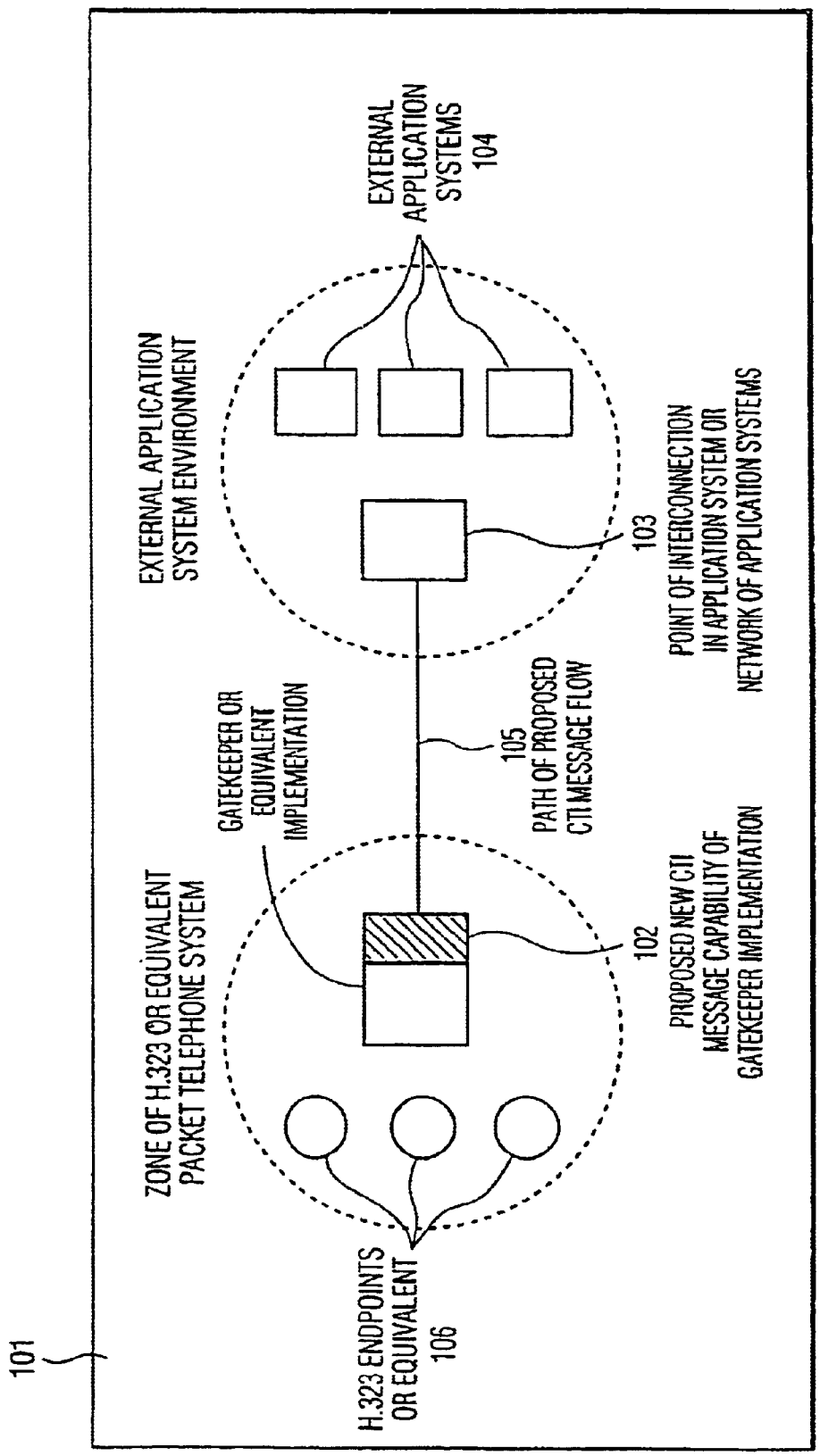
FIG. 1 shows a conceptual overview of an exemplary embodiment of the present invention as incorporated into a packet network telephony system.

FIG. 1 illustrates an overview of the interconnection of the gatekeeper computer 102 with the applications computer 103 according to the teachings of the present invention. To enable such interconnection, gatekeeper computer 102 is enhanced and extended by the addition of software whose functions are described below. Communications path 105 may be any type of data communications path.

The arrangement of FIG. 1 includes several external telephony applications systems 104, typically implemented as software, which may be located on applications computer 103 or on separate computers connected via any communications network to applications computer 103. Typically, the applications computer may be collocated with one of the end points described below.

The arrangement of FIG. 1 also includes end points 106, which may be personal computers, network computer devices (NCs), or any other node capable of interconnection to the packet network telephony environment.

In operation, a command is issued from an applications computer 103 requesting certain telephony services which will be described below. The message requesting such a service is transmitted through path 105 to gatekeeper computer 102 for processing. The message sent to gatekeeper 102 causes gatekeeper 102 to exchange appropriate signaling messages with other packet network telephony environment nodes in a manner as described, for example, in the incorporated H.323 standard. As a result of this sequence of events, the combined system is able to implement the call processing functionality requested by applications computer 103 on behalf of applications 104.

During operation, various call control functions requested by applications computer 103 are performed by the gatekeeper 102. Additionally, by making appropriate requests of gatekeeper 102, applications computer 103 may monitor the outcome of various call control functions and transmit such outcome to any of applications 104.

Figure 2:
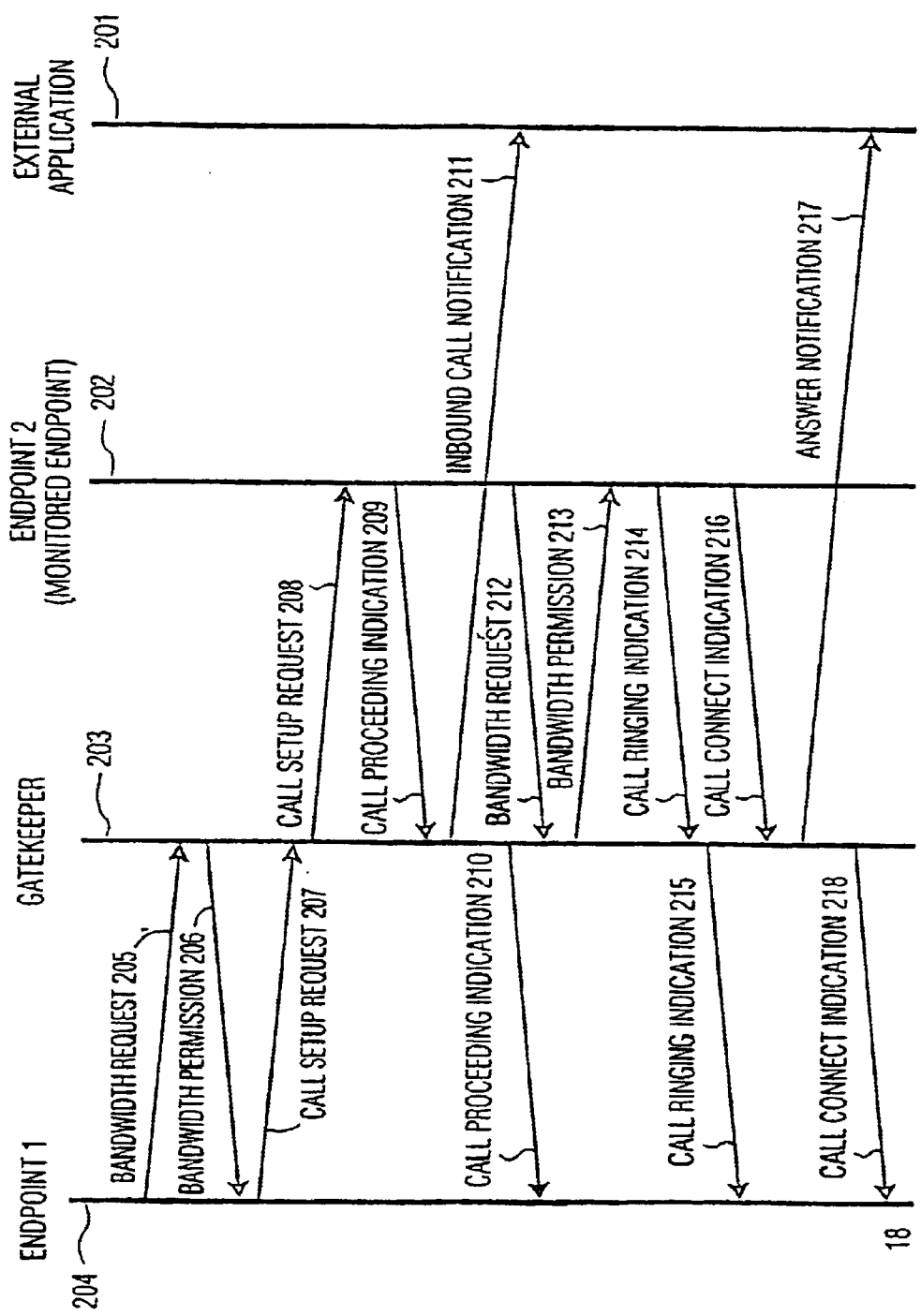
FIG. 2 shows exemplary message flow between system elements during the establishment of an inbound call that is detected by an external software application using the packet network telephony system as enhanced and extended by the present invention.

FIG. 2 shows an exemplary message flow diagram for detecting an inbound call from a remote end point to a local end point supervised by an external computer telephony application using the present invention. The specific example shown in FIG. 2 is the monitoring of an incoming call to end point 202 using packet network telephony methods and apparatus as described in the H.323 standard, enhanced by the present invention to permit the participation of an external software application 201. End points 202 and 204 represent audio terminals, for example, computer systems equipped as H.323 compliant telephone devices. Gatekeeper 203 is as described, for example, in the H.323 standard and as further enhanced by the present invention, and the external application 201 may be present on a separate computer as previously discussed.

In operation, the call initially proceeds according to the methods of the packet network telephony environment. A bandwidth request message 205 is sent to gatekeeper 203 and bandwidth is granted by the gatekeeper at message 206. A call setup request, message 2074, is issued by the initiating end point 204, and gatekeeper 203 causes call setup request message 208 to be transmitted to receiving end point 202. A call proceeding message 209 is transmitted by the receiving end point back to gatekeeper 203 and relayed to initiating end point 210 as shown.

At approximately the same time gatekeeper 203 relays the call proceeding indication to the initiating end point using message 210, gatekeeper 203 also transmits to external application 201 a notification that an inbound call is being received by the receiving end point 202. Gatekeeper 203 sends this message because external application 201 has previously indicated that it requires notification of telephony events occurring at receiving end point 202.

In order to connect the inbound call, receiving end point 202 requires network bandwidth, and such bandwidth is requested from and allocated by the gatekeeper 203 using messages 212 and 213. Next, the terminal at monitored end point 202 rings to alert the user to the arriving call, and an indication of such ringing is transmitted through messages 214 and 215 to initiating end point 204 through the gatekeeper 203. When the call is connected at the receiving end point 202 because of user action, end point 202 informs gatekeeper 203 via message 216.

At this point, gatekeeper 203 sends an answer notification to the external application 201 via message 217.

At approximately the same time, gatekeeper 203 indicates to the initiating end point 204 that the requested call has been connected via message 218.

In accordance with the protocol described hereinbefore, the detection of the call by an external application is accomplished via a protocol of messages transmitted between the gatekeeper and the end points to be connected, as well as between the gatekeeper 203 and the external application 201, thus enabling gatekeeper 203 to inform external application 201 regarding the progress of relevant calls in the packet telephony network.

Figure 3A:
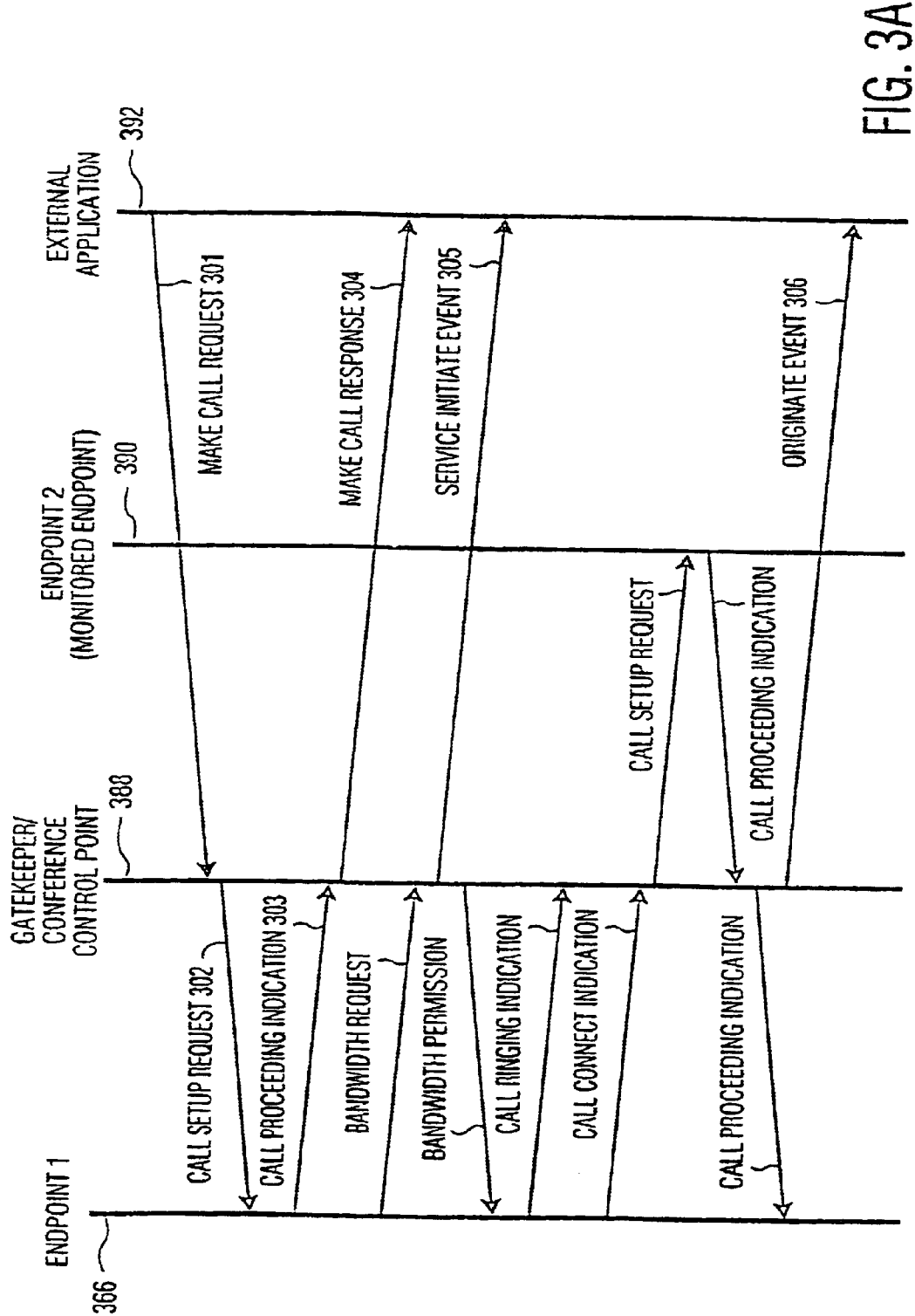
FIG. 3 shows an exemplary message flow diagram utilizing the invention to establish an outbound call requested by an external software application in a similar environment.
Figure 3B:
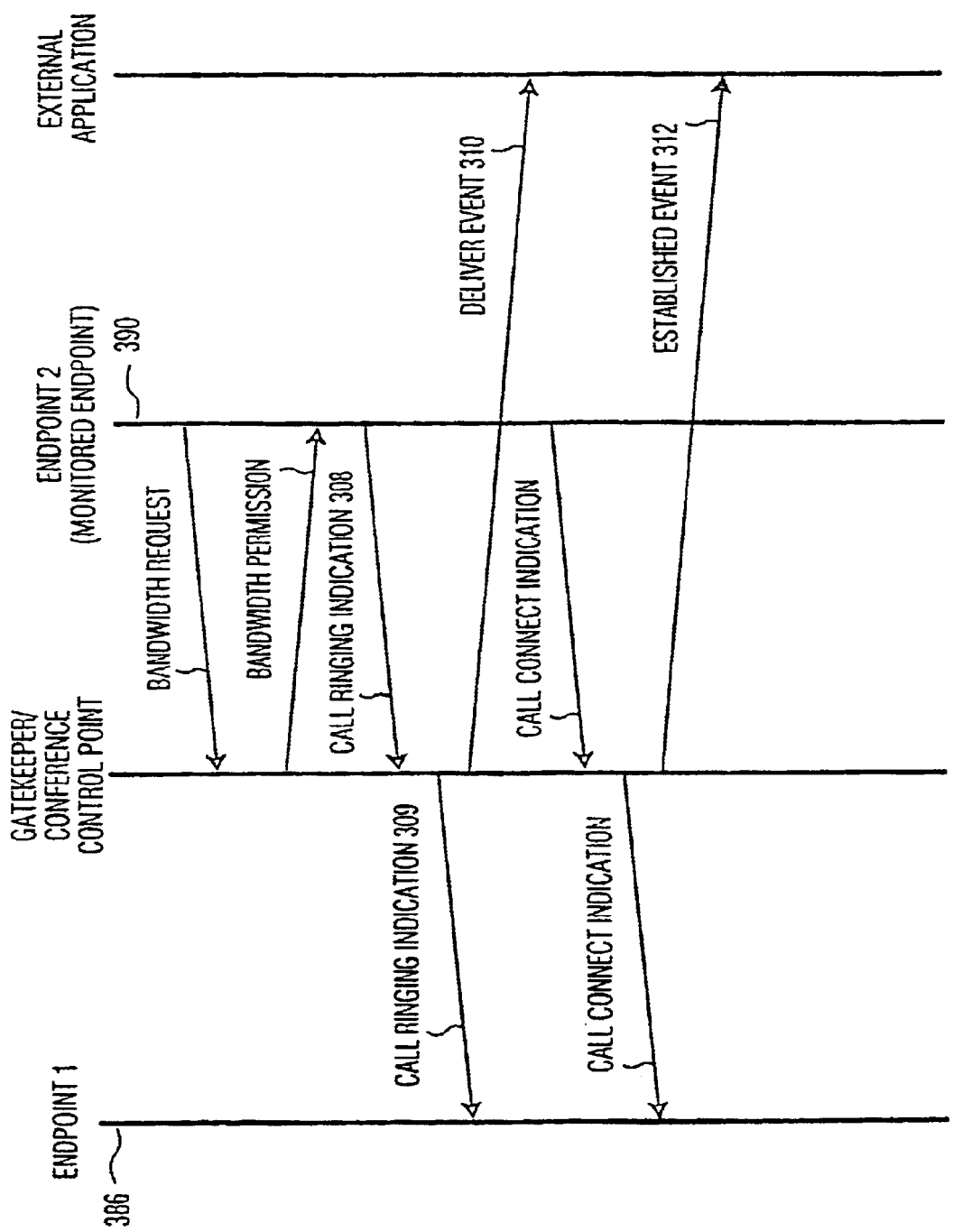

FIGS. 3A and 3B show another example of an external call processing application requesting the establishment of an outbound call from initiating end point 386 to receiving end point 390. Many of the messages involved in this operation are substantially similar to those previously set forth with respect to the monitoring of the inbound call described in FIG. 2. New messages not previously discussed in FIG. 2 are described below. As with the discussion of FIG. 2, the external application 392 in FIGS. 3A and 3B is assumed to have previously communicated with gatekeeper 388 in accordance with other methods described by this invention to indicate its intention to issue call control requests with respect to initiating end point 386.

In FIGS. 3A and 3B, gatekeeper 388 also includes the conference control point function as currently known to the packet network telephony art. This function is used by the invention to interconnect two call segments, namely the segment between the initiating end point 386 and the conference control point; and between the conference control point and the receiving end point 390. The invention connects the call in two stages in order to overcome certain limitations of the known packet network telephony art. For clarity of description, the combined gatekeeper and conference control point apparatus is referred to as a gatekeeper 388.

The sequence of messages begins with a new message 301, specified by the current invention, through which the external application 392 makes a request that the first segment of the call be established from gatekeeper 388 to initiating end point 386.

Next, according to known packet network telephony art, messages 302 and 303 are exchanged between gatekeeper and initiating end point 386 in order to set up that first leg of the call.

Next, the gatekeeper 388 sends a new message 304 to external application 392 to alert it that the call request has been received and is being processed. Much of the remaining signaling, relating to the establishment of that segment of the call between initiating end point 386 and gatekeeper 388 in FIGS. 3a and 3b, is substantially similar to that previously described with respect to FIG. 2 and thus will not be repeated. Similarly, once the first leg of the call has been set up, gatekeeper 388 proceeds in similar fashion to set up the second leg of the call from itself to receiving end point 390.

However, during the process depicted in FIGS. 3A and 3B gatekeeper 388 sends new messages to the external application 392 at relevant stages of call processing, including:

1. Message 305 indicating that initiating end point 386 has acquired the necessary network bandwidth to place the call;
2. Message 306 indicating that receiving end point 390 is processing the request for the call;
3. Message 310 indicating that receiving end point 390 is alerting its user to the arriving call; and
4. Message 312 indicating that receiving end point 390 has answered the call and a connection has been established.

Figure 4:
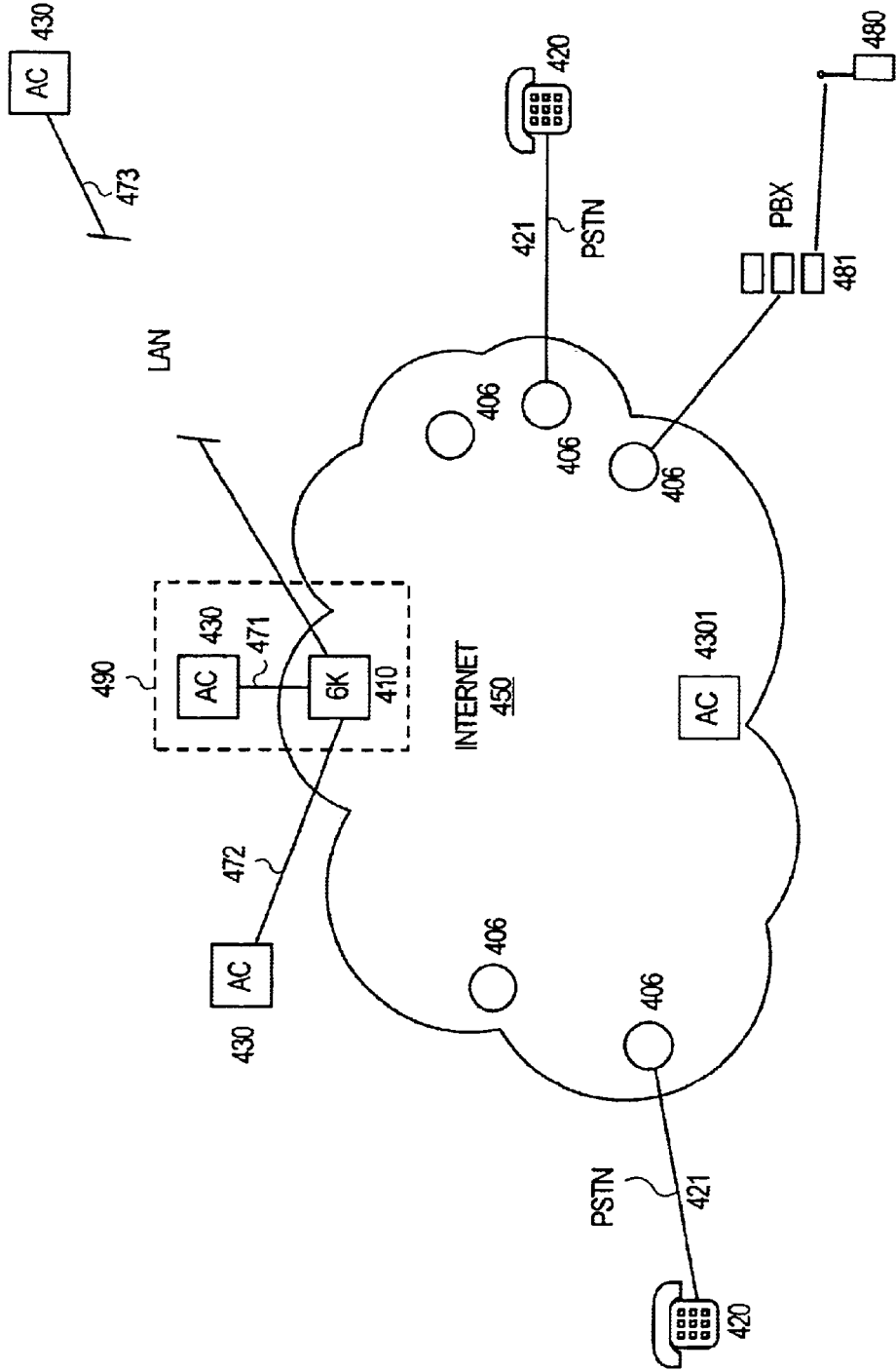
FIG. 4 shows exemplary connections between the gatekeeper computer and processing application computers controlling the gatekeeper computer.

FIG. 4 shows various possible connections for the gatekeeper computer-processing application computer link. A gatekeeper computer 410 facilitates calls between the various H323 or equivalent endpoints 406. As an example, these endpoints can be connected to telephones 420 via PSTNs 421. Alternatively, the endpoints can be connected to other computers or devices, such as PBXs 481, which then interface to, as an example, cellular networks 480.

The processing application computers (AC) 430 are connected to the gatekeeper computer (GK) 410 in a variety of ways, some of which are shown as examples in FIG. 4. The gatekeeper computer sets up and controls call sessions between the various H.323 or equivalent endpoints 406.

One or more ACs 430 can be connected to the GK 410 via a LAN 473, a generic data network 472, or via interprocess software communication 471, where both the GK and AC are software modules on the same physical computing device, shown via the dotted line box 490 drawn around these components connected via the interprocess software communication 471.

Alternatively, the AC 4301 and GK 410 can be themselves connected via the Internet 450, or other computer communications network. Or, the GK 410 could write to a file, store, and then itself transmit to an AC 430, via a variety of data transmission channels, as described above, or as is otherwise known in the art.

The ACs 430, communicating with the GK in an analogous fashion as described above, can implement, via a variety of applications programs, applications and services such as voice recognition of the words exchanged in the call, rerouting the call if unanswered after a determined number of rings, measurement of the length of the call, and storing the word content of calls as determined by the above described voice recognizer and writing such content to a file for analysis by another program, to list a few. As described above these applications are usually implemented in software, but could be serviced, wholly or partially, in dedicated hardware as well, especially in complex applications requiring a lot of processing.

The above describes the preferred embodiment of the invention. It will be appreciated however that various other modifications or additions will be apparent to those of ordinary skill in the art.

What is claimed is:

1. A method comprising:

transmitting, from an application computer connected to a data network to a call processing device connected to said data network, over said data network, packetized messages indicative of telephone calls in progress at an endpoint of said data network, or indicative of said endpoint, said application computer being located separately from said endpoint; and transmitting, from said call processing device to said application computer over said data network, packetized messages indicative of the length of said telephone calls.

2. The method of claim 1, wherein said packetized messages include the originating IP address of the call.

3. The method of claim 1, wherein said packetized messages include the words exchanged in the call.

4. A method comprising:

transmitting, from an application computer connected to a data network to a call processing device connected to said data network, over said data network, packetized messages indicative of telephone calls in progress at an endpoint of said data network, or indicative of said endpoint, said application computer being located separately from said endpoint; and transmitting, from said call processing device to said application computer over said data network, packetized messages indicative of the information in said telephone calls.

5. The method of claim 4, wherein said information includes the originating IP address of the call.

6. The method of claim 4, wherein said information includes the words exchanged in the call.

7. A method comprising:

transmitting, from an application computer communicably connected to a call processing device which is connected to a data network, packetized messages indicative of telephone calls in progress at an endpoint of said data network, or indicative of said endpoint; and transmitting, from said call processing device to said application computer, packetized messages indicative of the information in said telephone calls.

8. The method of claim 7, wherein said information includes the originating IP address of the call.

9. The method of claim 7, wherein said information includes the words exchanged in the call.

* * * * *